US009414201B2

(12) United States Patent
Choi et al.

(10) Patent No.: US 9,414,201 B2
(45) Date of Patent: Aug. 9, 2016

(54) INFORMATION PROVIDING APPARATUS AND METHOD THEREOF

(71) Applicant: LG ELECTRONICS INC., Seoul (KR)

(72) Inventors: Sungha Choi, Seoul (KR); Seyoung Lee, Seoul (KR); Yunhui Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/719,552

(22) Filed: May 22, 2015

(65) Prior Publication Data
US 2015/0341755 A1 Nov. 26, 2015

(30) Foreign Application Priority Data

May 26, 2014 (KR) .......................... 10-2014-0063204

(51) Int. Cl.
*H04W 4/04* (2009.01)
*H04L 29/08* (2006.01)
(Continued)

(52) U.S. Cl.
CPC ................. *H04W 4/04* (2013.01); *B60K 35/00* (2013.01); *B60K 37/02* (2013.01); *G06F 3/0488* (2013.01); *G06F 3/14* (2013.01); *G09G 5/14* (2013.01); *H04L 67/12* (2013.01); *H04N 21/2146* (2013.01); *H04N 21/25841* (2013.01); *H04N 21/4126* (2013.01); *H04N 21/41407* (2013.01);
(Continued)

(58) Field of Classification Search
CPC ....... H04W 4/04; H04W 4/008; H04W 4/021; H04W 76/023; H04L 67/12

USPC ......................................................... 455/457
See application file for complete search history.

(56) References Cited

U.S. PATENT DOCUMENTS

| 8,255,154 B2 * | 8/2012 | Zilka ..................... G01C 21/362 340/572.3 |
| 2001/0048749 A1 * | 12/2001 | Ohmura .................. H04B 1/20 381/86 |

(Continued)

FOREIGN PATENT DOCUMENTS

| CN | 103297608 | 9/2013 |
| KR | 10-0667058 B1 | 1/2007 |

(Continued)

OTHER PUBLICATIONS

Korean Notice of Allowance dated Apr. 1, 2015 for Korean Application No. 10-2014-0063204, with English Translation, 5 Pages.
(Continued)

*Primary Examiner* — Michael Neff
(74) *Attorney, Agent, or Firm* — Fish & Richardson P.C.

(57) ABSTRACT

Provided are an information providing apparatus and a method thereof capable of easily and effectively using information stored in each of a plurality of terminals. The information providing apparatus includes a communication unit configured to establish a communication network with a mobile terminal within a vehicle, a display unit configured to display a vehicle image, and a control unit configured to receive identification information of the mobile terminal and position information of the mobile terminal through the communication unit, and to control the display unit to display the received position information of the mobile terminal in the vehicle image and display a mobile terminal image corresponding to the identification information in the displayed position information of the mobile terminal.

20 Claims, 17 Drawing Sheets

(51) Int. Cl.
*H04W 76/02* (2009.01)
*H04W 4/00* (2009.01)
*H04W 4/02* (2009.01)
*B60K 35/00* (2006.01)
*B60K 37/02* (2006.01)
*G06F 3/0488* (2013.01)
*G06F 3/14* (2006.01)
*H04N 21/214* (2011.01)
*H04N 21/258* (2011.01)
*H04N 21/41* (2011.01)
*H04N 21/414* (2011.01)
*H04N 21/436* (2011.01)
*H04N 21/4363* (2011.01)
*H04N 21/45* (2011.01)
*H04N 21/485* (2011.01)
*G09G 5/14* (2006.01)

(52) U.S. Cl.
CPC ... *H04N 21/43615* (2013.01); *H04N 21/43637* (2013.01); *H04N 21/4524* (2013.01); *H04N 21/485* (2013.01); *H04W 4/008* (2013.01); *H04W 4/021* (2013.01); *H04W 76/023* (2013.01); *G09G 2340/12* (2013.01); *G09G 2340/125* (2013.01); *G09G 2370/16* (2013.01); *G09G 2380/10* (2013.01)

(56) References Cited

U.S. PATENT DOCUMENTS

| | | | |
|---|---|---|---|
| 2005/0039208 A1* | 2/2005 | Veeck | H04N 7/18 725/76 |
| 2009/0209296 A1* | 8/2009 | Kimura | H04M 1/56 455/567 |
| 2010/0256864 A1* | 10/2010 | Ying | H04L 12/2697 701/31.4 |
| 2012/0242474 A1* | 9/2012 | Oh | G01C 21/3688 340/441 |
| 2014/0125355 A1* | 5/2014 | Grant | B64D 11/06 324/629 |
| 2015/0210287 A1* | 7/2015 | Penilla | B60W 40/08 701/49 |

FOREIGN PATENT DOCUMENTS

| | | |
|---|---|---|
| WO | 2014/033912 | 3/2014 |
| WO | 2014/041646 | 3/2014 |

OTHER PUBLICATIONS

Office Action issued in Chinese Application No. 201510378568.1 on Apr. 6, 2016, 12 pages (with English translation).

* cited by examiner

INFORMATION PROVIDING APPARATUS AND METHOD THEREOF

CROSS-REFERENCE TO RELATED APPLICATION

Pursuant to 35 U.S.C. §119(a), this application claims the benefit of earlier filing date and right of priority to Korean Application No. 10-2014-0063204, filed on May 26, 2014, the contents of which is incorporated by reference herein in its entirety.

BACKGROUND OF THE INVENTION

1. Field of the Invention

The present disclosure relates to an information providing apparatus and a method thereof.

2. Background of the Invention

In general, related art information providing apparatuses are applied to various devices such as mobile terminals, notebook computers, and televisions, and provide various types of information such as a television broadcast program and audio information to users.

SUMMARY OF THE INVENTION

Therefore, an aspect of the detailed description is to provide an information providing apparatus capable of interworking with a plurality of terminals within a vehicle and easily and rapidly receiving an application program desired by a user from the plurality of terminals and executing the received application program, thereby easily and effectively using information items (for example, an application program, content, data, and the like) stored in each of the plurality of terminals, and a method thereof.

To achieve these and other advantages and in accordance with the purpose of this specification, as embodied and broadly described herein, an information providing apparatus may include: a communication unit configured to establish a communication network with a mobile terminal within a vehicle; a display unit configured to display a vehicle image; and a control unit configured to receive identification information of the mobile terminal and position information of the mobile terminal through the communication unit, and to control the display unit to display the received position information of the mobile terminal in the vehicle image and display a mobile terminal image corresponding to the identification information in the displayed position information of the mobile terminal.

In an example related to the present disclosure, the information providing apparatus may further include: a position information generating unit configured to generate the position information corresponding to a seat position of the vehicle when the mobile terminal approaches, and transmit the generated position information to the mobile terminal, wherein the mobile terminal transmits the position information transmitted from the position information generating unit to the control unit.

In an example related to the present disclosure, the position information generating unit may include: a first near field communication (NFC) tag installed in the driver's seat of the vehicle and configured to generate first position information indicating a position of the driver's seat of the vehicle; a second NFC tag installed in the passenger seat of the vehicle and configured to generate second position information indicating a position of the passenger seat of the vehicle; a third NFC tag installed in the back seat of the passenger seat of the vehicle and configured to generate third position information indicating a position of the back seat of the passenger seat of the vehicle; and a fourth NFC tag installed in the back seat of the driver's seat of the vehicle and configured to generate fourth position information indicating a position of the back seat of the driver's seat of the vehicle.

In an example related to the present disclosure, the position information generating unit may include: a first USB module installed in the driver's seat of the vehicle and configured to provide the first position information indicating a position of the driver's seat of the vehicle to the control unit; a second USB module installed in the passenger seat of the vehicle and configured to provide the second position information indicating a position of the passenger seat of the vehicle to the control unit; a third USB module installed in the back seat of the passenger seat of the vehicle and configured to provide the third position information indicating a position of the back seat of the passenger seat of the vehicle to the control unit; and a fourth USB module installed in the back seat of the driver's seat of the vehicle and configured to provide the fourth position information indicating a position of the back seat of the driver's seat of the vehicle to the control unit.

In an example related to the present disclosure, the control unit may detect position information of a mobile communication terminal within the vehicle on the basis of signals from a plurality of beacons installed within the vehicle.

In an example related to the present disclosure, the position information may be position information selected from a position setting menu of the mobile terminal.

In an example related to the present disclosure, the position setting menu may include: a first item indicating the position of the driver's seat; a second item indicating the position of the passenger seat; a third item indicating the position of the back seat of the passenger seat; and a fourth item indicating the position of the back seat of the driver's seat.

In an example related to the present disclosure, when the mobile terminal image is selected, the control unit may receive content from a mobile terminal corresponding to the selected mobile terminal image, and display the received content on the display unit.

In an example related to the present disclosure, the content may be one or more among application program icons, a message, a schedule, and a contact number.

In an example related to the present disclosure, on the basis of position information of each of a plurality of mobile terminals within the vehicle, the control unit may display a plurality of mobile terminal images corresponding to the plurality of mobile terminals in seat positions of the vehicle image, and when a first mobile terminal image is selected from among the plurality of mobile terminal images, the control unit may receive a first page including application program icons from a first mobile terminal corresponding to the selected first mobile terminal image, and display the received first page on the display unit, and in a state in which the first page is displayed on the display unit, when a first user input is received, the control unit may receive a second page including application program icons from a second mobile terminal among the plurality of mobile terminals, and display the received second page on the display unit, and in a state in which the first page is displayed on the display unit, when a second user input is received, the control unit may receive a next page following the first page from the first mobile terminal and display the received next page on the display unit.

In an example related to the present disclosure, when one or more application program icons are selected from the first page, the control unit may receive application programs corresponding to the one or more selected application program icons from the first mobile terminal and display the received application programs on the display unit.

In an example related to the present disclosure, when one or more application program icons are selected from a first page of the first mobile terminal and a second page of the second mobile terminal, the control unit may receive application programs corresponding to the one or more selected application program icons from the first and second mobile terminals, and display the received application programs on a single screen of the display unit.

In an example related to the present disclosure, after a first application program icon of the first page of the first mobile terminal is long-touched, when a second application program icon of the second page of the second mobile terminal is short-touched, the control unit may simultaneously receive first and second application programs corresponding to the first and second application program icons from the first and second mobile communication terminals, and display the received first and second application programs on a single screen of the display unit.

In an example related to the present disclosure, when the first application program icon of the first page of the first mobile terminal is drag-and-dropped to the second application program icon of the second page of the second mobile terminal, the control unit may simultaneously receive first and second application programs corresponding to the first and second application program icons from the first and second mobile communication terminals, and display the received first and second application programs on a single screen of the display unit.

In an example related to the present disclosure, the control unit may display an application program excluding an application program providing one-time information, among the received first and second application programs, on the display unit according to a first display format, and display the application program providing the one-time information on the display unit according to a second display format different from the first display format.

To achieve these and other advantages and in accordance with the purpose of this specification, as embodied and broadly described herein, an information providing method may include: establishing a communication network with a mobile terminal within a vehicle; displaying a vehicle image on a display unit; receiving identification information of the mobile terminal and position information of the mobile terminal through the communication network; and controlling the display unit to display the received position information of the mobile terminal in the vehicle image and to display a mobile terminal image corresponding to the identification information in the displayed position information of the mobile terminal.

According to the information providing apparatus and the method thereof of exemplary embodiments of the present disclosure, a user may easily and quickly check information (position information and identification information) of a state of connections between a plurality of mobile terminals within a vehicle by intuition.

Also, since the information providing apparatus of exemplary embodiments of the present disclosure interworks with a plurality of terminals within a vehicle and easily and quickly receive content desired by the user from the plurality of terminals and display the received content, information (for example, an application program, content, data, and the like) stored in each of the plurality of terminals may be easily and rapidly used.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

The exemplary embodiments of the present invention will now be described with reference to the accompanying drawings, in which like numbers refer to like elements throughout.

Also, in describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Figure 1:
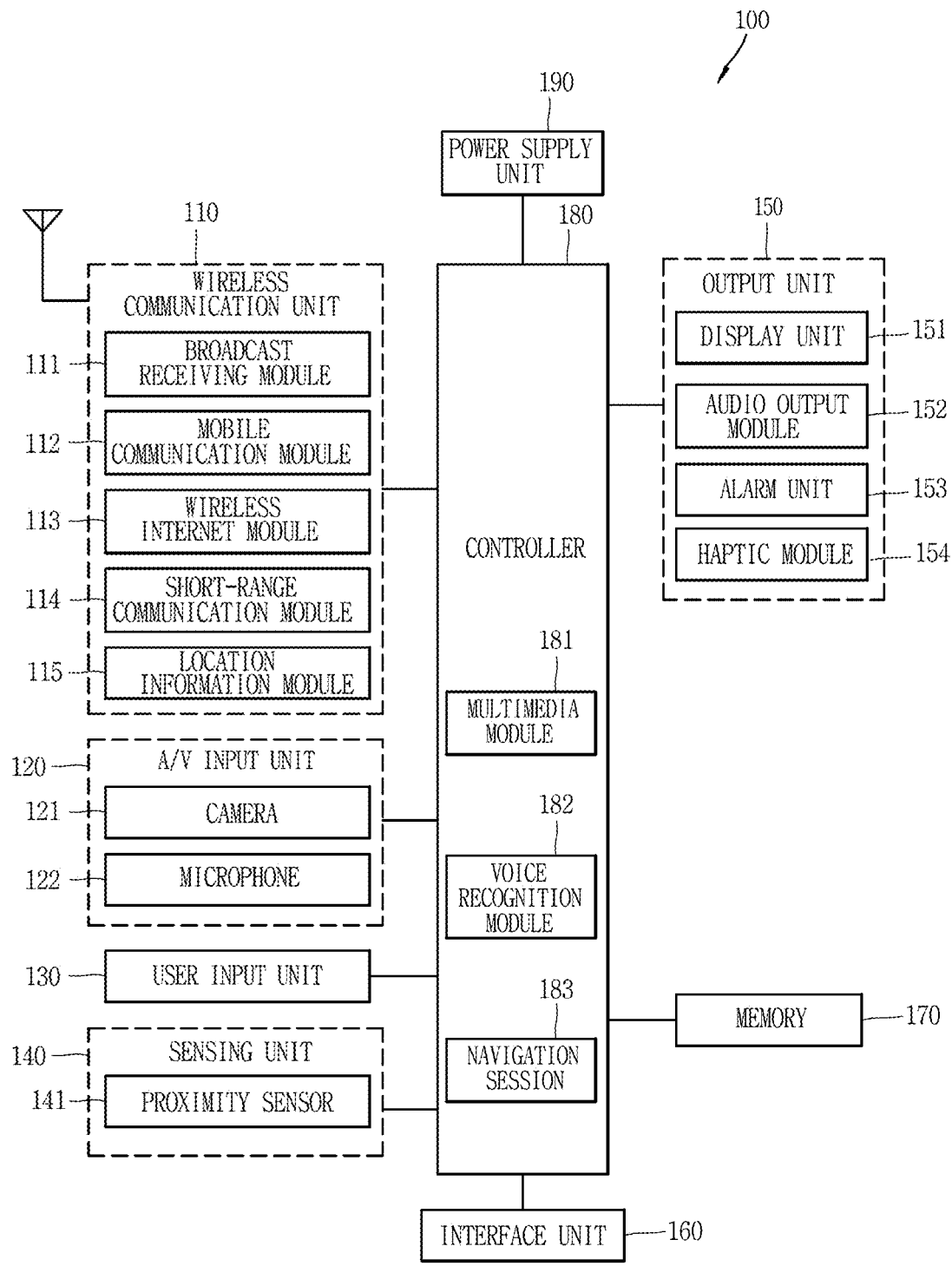
FIG. 1 is a block diagram illustrating a configuration of a mobile communication terminal according to exemplary embodiments of the present disclosure.

FIG. 1 is a view illustrating a configuration of a mobile communication terminal 100 according to embodiments of the present invention. The mobile communication terminal (i.e., a cellular phone or a mobile phone) 100 may be implemented in various forms such as mobile phones, smart phones, notebook computers, digital broadcast terminals, PDAs (Personal Digital Assistants), PMPs (Portable Multimedia Player), etc.

As illustrated in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile communication terminal 100 having various components, but it is understood that implementing all of the illustrated components is not a requirement. The mobile communication terminal 100 may be implemented by greater or fewer components.

The wireless communication unit 110 typically includes one or more components allowing radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the terminal. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile communication terminal (when the mobile communication terminal is located in a vehicle, the location of the vehicle can be checked). For example, the location information module 115 may be embodied by using a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry on the basis of the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or a hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capturing device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile communication terminal 100 such as an opened or closed state of the mobile communication terminal 100, a location of the mobile communication terminal 100, the presence or absence of user contact with the mobile communication terminal 100 (i.e., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating user's authority for using the mobile communication terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile communication terminal 100 or may be used to transfer data within the mobile communication terminal to an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. The mobile terminal 100 may include two or more display units (or other display means) according to its particular desired embodiment. For example, the mobile terminal may include both an external display unit (not shown) and an internal display unit (not shown).

When the display unit 151 and the touch pad are overlaid in a layered manner to form a touch screen, the display unit 151 may function as both an input device and an output device.

The touch sensor may have the form of, for example, a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input position and a touch input area. When there is a touch input with respect to the touch sensor, the corresponding signal(s) are sent to a touch controller (not shown). The touch controller processes the signal(s) and transmits corresponding data to the controller 180. Accordingly, the controller 180 can recognize a touched region of the display unit 151.

A proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected on the basis of a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. When a call signal is received or a message is received, the alarm unit 153 may vibrate the mobile terminal through a vibration means. Or, when a key signal is inputted, the alarm unit 153 may vibrate the mobile terminal 100 through a vibration means as a feedback with respect to the key signal input. Through the vibration, the user may recognize the occurrence of an event. A signal for notifying about the occurrence of an event may be output to the display unit 151 or to the voice output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100. The haptic module 154 may be provided to a place which is frequently in contact with the user. For example, the haptic module 154 may be provided to a steering wheel, a gearshift, a lever, a seat, and the like.

The memory 160 may store software programs used for the processing and controlling operations performed by the controller 180, or may temporarily store data (e.g., a map data, phonebook, messages, still images, video, etc.) that are inputted or outputted.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. Here, the identification module may be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself. For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

The voice recognition module (voice recognition engine) 182 recognizes a voice pronounced by the user and performs a corresponding function according to the recognized voice signal.

A navigation session 183 applied to the mobile terminal 100 displays a route from a point of departure to a destination on map data.

Figure 2:
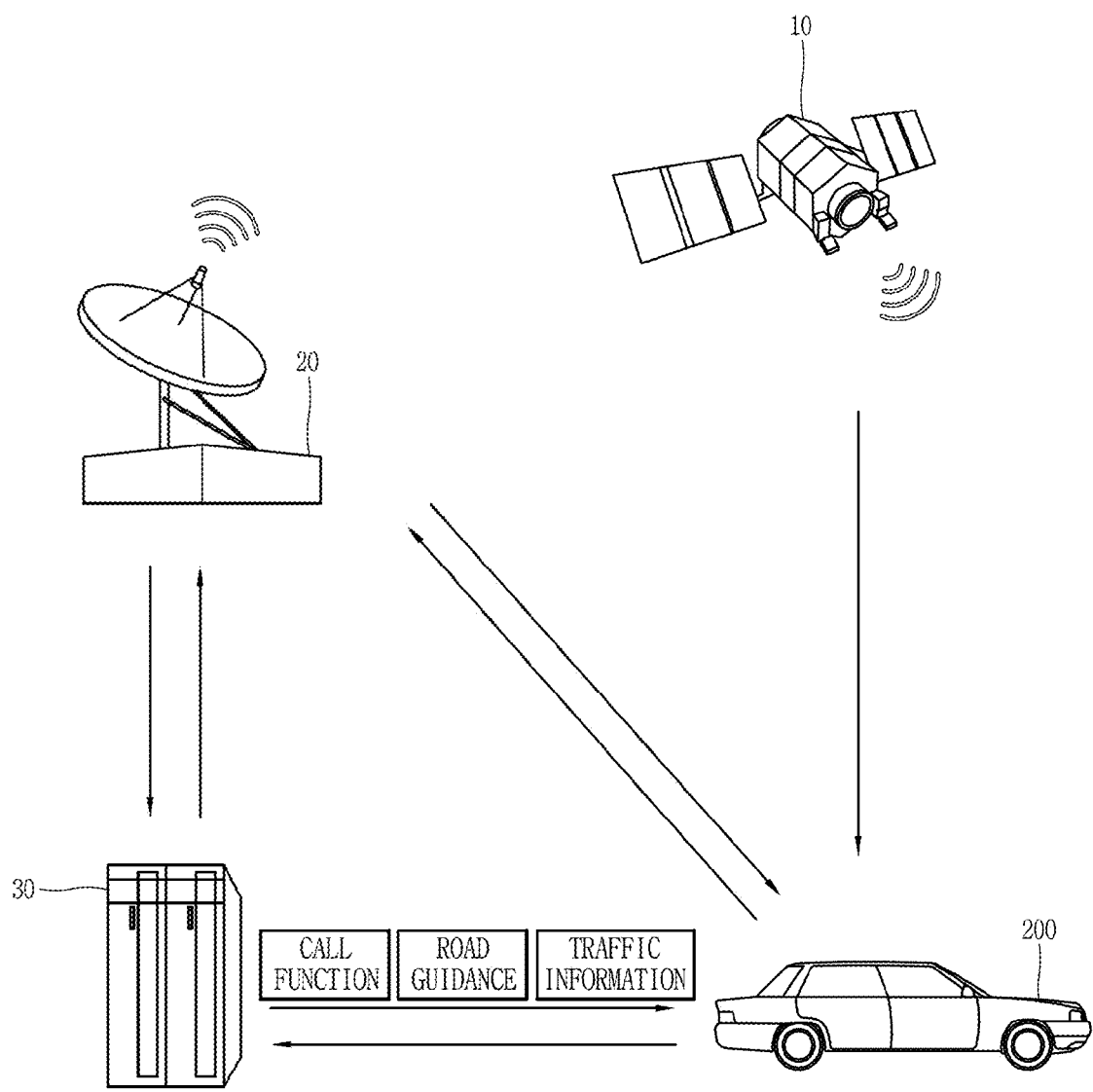
FIG. 2 is a block diagram illustrating a vehicle navigation system according to exemplary embodiments of the present disclosure.

FIG. 2 is a view illustrating a vehicle navigation system according to exemplary embodiments of the present disclosure.

As illustrated in FIG. 2, a vehicle navigation system includes an information providing center (server) 30 providing traffic information and various types of data (e.g. a program, an execution file, and the like); and a telematics terminal 200 mounted within a vehicle, receiving traffic information through a wide area wireless communication network 20 and/or a local area wireless communication network, and providing a road guidance service on the basis of an artificial satellite 10. Here, the communication network may further include a wired/wireless communication network such as a local area network (LAN) or a wide area network (WAN).

Through the communication network, various types of traffic information (e.g., road traffic information, information regarding a point of interest (POI)) including information regarding a traffic light, are collected, and the collected information is processed by an information providing center 30 (e.g., a server) according to a TPEG (Transport Protocol Expert Group) standard and transmitted to a broadcast station. Then, the broadcast station inserts the traffic information including the information regarding a traffic light into a broadcast signal and broadcasts the same to the telematics terminal 200 of the vehicle. The information providing center 30 (for example, a server) may transmit the traffic information to the telematics terminal 200 of the vehicle through the communication network.

The server reconfigures various types of traffic information, which are collected through various paths connected to the communication network, for example, according to an operator input, through the wired/wireless Internet, from digital broadcast services such as a TDC (Transparent Data Channel) or a MOC (Multimedia Object Transport), from a different server, or from a probe car, into a traffic information format such as a format in conformity with a TPEG (Transport Protocol Expert Group) standard, namely, for example, a standard for a traffic information service, and transmits the same to the broadcast station or the telematics terminal 200.

The server may generate a traffic information format on the basis of the TPEG standard including traffic light information, and transmit the same to the broadcast station. The traffic information may include traffic light information and may also include information regarding various traffic conditions required for vehicle driving in roads, sea traffic, airline flights, such as accidents, a road situation, traffic congestion, road construction, road blockage (or road closure), a public transportation network delay, air transportation holdup, and the like.

The broadcast station receives the processed traffic information including traffic light information from the server and transmits it through digital signals in conformity with various digital broadcast standards to the vehicle 200. In this case, the broadcast standards include a European digital audio broadcasting (DAB) standard on the basis of Eureca-147 [ETSI EN 300 401), a terrestrial or satellite digital multimedia broadcasting (DMB) standard, a terrestrial digital video broadcasting (DVB-T) standard, a mobile digital video broadcasting-handheld (DVB-H) standard, media forward link only (MFLO) standard, and the like.

Also, the broadcast station may transmit the traffic information including the traffic light information through a wired/wireless network such as the wired/wireless Internet.

The telematics terminal 200 receives traffic light information included in the traffic information and transfers the traffic light information to the user through graphics, text, and/or audio.

Hereinafter, the configuration of the telematics terminal 200 installed in a vehicle according to an exemplary embodiment of the present disclosure will be described with reference to FIG. 3.

Figure 3:
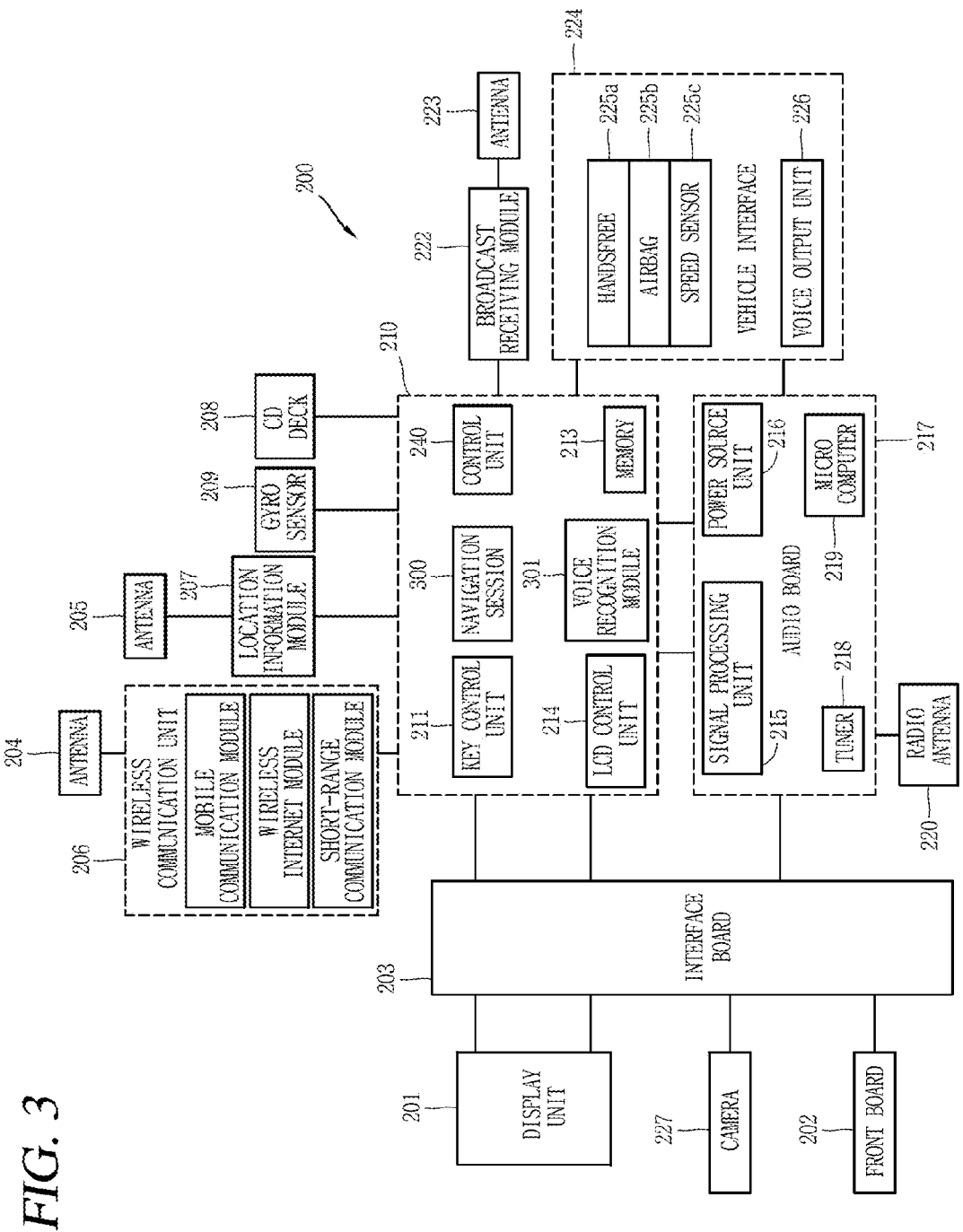
FIG. 3 is a block diagram illustrating a configuration of a telematics terminal according to exemplary embodiments of the present disclosure.

FIG. 3 is a schematic block diagram illustrating a configuration of a telematics terminal 200 according to exemplary embodiments of the present disclosure.

As illustrated in FIG. 3, the telematics terminal (or a head unit) 200 includes a main board 210 including a controller (e.g., a central processing unit (CPU)) 240 for controlling the telematics terminal 200 on the whole, a memory 213 for storing various types of information, a key controller 211 for controlling various key signals, and a liquid crystal display (LCD) controller 214 for controlling an LCD.

The memory 213 stores map information (map data) for displaying road guidance information on a digital map. Also, the memory 213 stores a traffic information collecting control algorithm for inputting traffic information according to the situation of a road in which the vehicle currently travels (runs), and information for controlling the algorithm.

The telematics terminal (or head unit) 200 includes a communication unit 206 including a short-range communication unit (for example, Bluetooth™) and a remote communication unit (for example, a code division multiple access (CDMA) communication unit), a global position system (GPS) module 207 for guiding a location of the vehicle, receiving a GPS signal for tracking a travel route from a start point to a destination, or transmitting traffic information collected by the user, as a GPS signal, a CD deck 208 for reproducing a signal recorded in a CD (Compact Disk), a gyro sensor 209, and the like.

The communication unit 206 and the GPS module 207 may transmit and receive signals through antennas 204 and 205.

A broadcast receiving module 222 is connected with the main board 210 and receives a broadcast signal via an antenna 223. A display unit (i.e., an LCD) 201 under the control of the LCD controller 214, a front board 202 under the control of the key controller 211, and a camera 227 for capturing the interior and/or the exterior of a vehicle are connected to the main board 210 via an interface board 203. The display unit 201 displays various video signals and character signals, and the front board 202 includes buttons for various key signal inputs and provides a key signal corresponding to a button selected by the user to the main board 210. Also, the display unit 201 includes a proximity sensor and a touch sensor (touch screen) of FIG. 2.

The front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219, and a signal processing unit 215 for processing various voice signals.

The audio board 217 also includes a radio antenna 220 for receiving a radio signal and a tape deck 221 for reproducing an audio tape. The audio board 217 may further include a voice output unit (e.g., an amplifier) 226 for outputting a voice signal processed by the audio board 217.

The voice output unit (amplifier) 226 is connected to a vehicle interface 224. Namely, the audio board 217 and the main board 210 are connected to the vehicle interface 224. A handsfree 225a for inputting a voice signal, an airbag 225b configured for the security of a passenger, a speed sensor 225c for detecting a speed of the vehicle, and the like, may be connected to the vehicle interface 224. The speed sensor 225c calculates a vehicle speed and provides the calculated vehicle speed information to the CPU 240.

The navigation session 300 applied to the telematics terminal 200 generates road guidance information on the basis of the map data and current location information of the vehicle and provides the generated road guidance information to a user.

The display unit 201 detects a proximity touch within a display window via a proximity sensor. For example, when a pointer (e.g., user's finger or a stylus) is proximity-touched, the display unit 201 detects the position of the proximity touch and outputs position information corresponding to the detected position to the controller 212.

A voice recognition module (or a voice recognition engine) 301 recognizes a voice pronounced by the user and performs a corresponding function according to the recognized voice signal.

The navigation session 300 applied to the telematics terminal 200 displays a travel route on map data, and when the location of the mobile terminal 100 is within a pre-set distance from a blind spot included in the travel route, the navigation session 300 automatically forms a wireless network with a terminal mounted in an adjacent vehicle (e.g., a vehicle navigation device) and/or a mobile communication terminal carried by a nearby pedestrian through wireless communication (e.g., a short-range wireless communication network), to receive location information of the adjacent vehicle from the terminal mounted in the adjacent vehicle and receive location information of the nearby pedestrian from the mobile communication terminal carried by the nearby pedestrian.

Hereinafter, an information providing apparatus capable of interworking with a plurality of terminals within a vehicle and easily and rapidly receiving an application program desired by a user from the plurality of terminals and executing the received application program, thereby easily and effectively using information items (for example, an application program, content, data, and the like) stored in each of the plurality of terminals, and a method thereof will be described. The plurality of terminals may be homogeneous terminals or heterogeneous terminals. The information providing apparatus according to exemplary embodiments of the present disclosure may include a communication unit 206 configured to establish a communication network with a plurality of terminals within a vehicle, a display unit 201 configured to display a vehicle image, and a control unit 240 configured to receive identification information of the plurality of terminals and position information of the plurality of terminals through the communication unit 206, and to control the display unit 201 to display the received position information of the plurality of terminals in the vehicle image and to display terminal images corresponding to the identification information in the displayed position information of the terminals.

Figure 4:
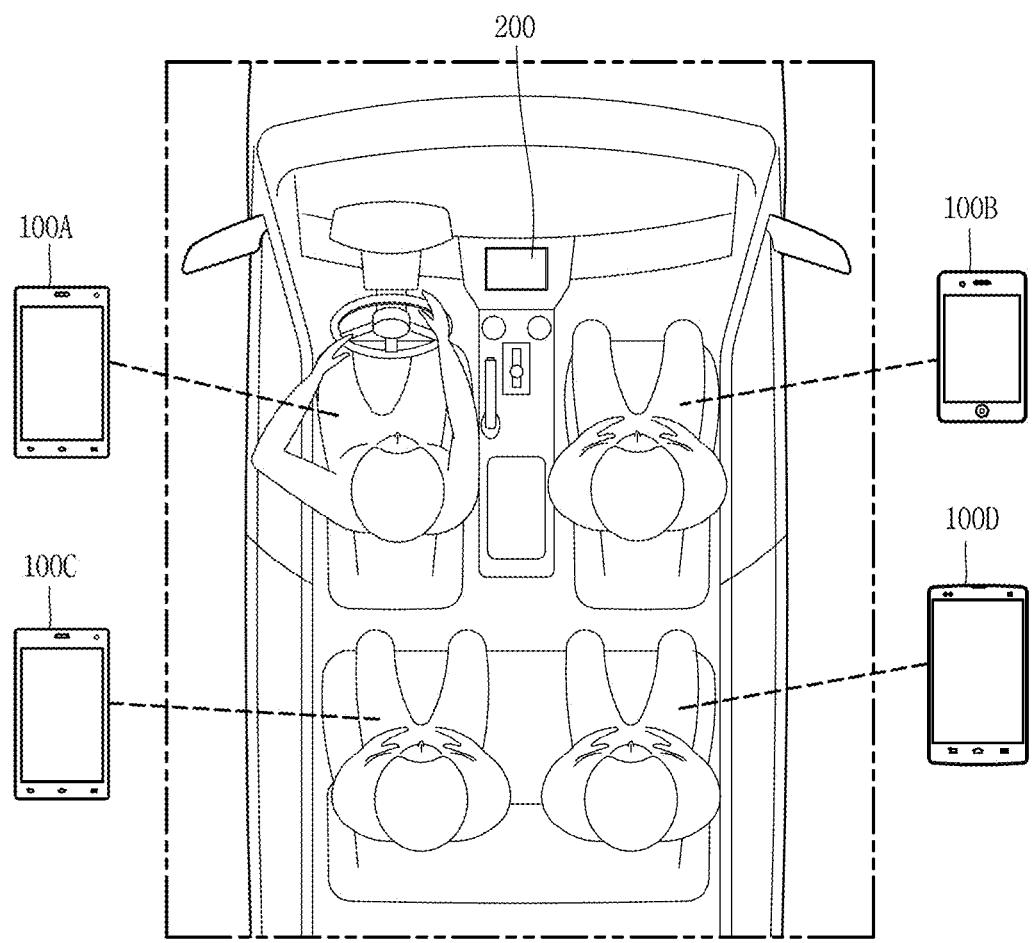
FIG. 4 is a view illustrating a plurality of terminals interworking with each other in a vehicle according to exemplary embodiments of the present disclosure.

FIG. 4 is a view illustrating a plurality of terminals interworking with each other in a vehicle according to exemplary embodiments of the present disclosure.

As illustrated in FIG. 4, the plurality of terminals may include a telematics terminal (or a head unit) 200 and a plurality of mobile communication terminals 100A, 100B, 100C, and 100D installed in a vehicle, and the plurality of terminals may be connected to each other through a wireless or wired communication network. The telematics terminal 200 may be used by a vehicle driver, and the plurality of mobile communication terminals 100 may be used by vehicle passenger(s).

Instead of the telematics terminal 200, a navigation device or the mobile communication terminal 100 may be used. Instead of the plurality of mobile communication terminals 100, a plurality of rear seat entertainment systems (RSEs), a plurality of cellular phones, a plurality of smartphones, a plurality of notebook computers, a plurality of digital broadcasting terminals, a plurality of personal digital assistants (PDAs), a plurality of portable multimedia players (PMPs), a plurality of tablet personal computers (PCs), and the like, may also be used. Hereinafter, the telematics terminal 200 and one or more mobile communication terminals 100 will be described as an example.

The telematics terminal 200 interworks with a plurality of terminals within a vehicle and easily and rapidly receive an application program desired by the user from the plurality of terminals and execute the received application program, thereby effectively using information (for example, an application program, content, data, and the like) stored in each of the plurality of terminals.

The mobile communication terminal 100 interworks with the telematics terminal 200 within the vehicle and other mobile communication terminals within the vehicle, and easily and rapidly receives an application program desired by the user from the telematics terminal 200 and the other mobile communication terminals and executes the received application program, thereby effectively using information (for example, an application program, content, data, and the like) stored in each of the plurality of terminals.

That is, since the plurality of terminals may exchange mutual information with each other within the vehicle, and thus, hereinafter, only an apparatus and a method thereof in which the telematics terminal 200 interworks with a plurality of terminals within a vehicle and an application program desired by the user is easily and rapidly received from the plurality of terminals and executed, thereby easily and effectively using information (for example, an application program, content, data, and the like) stored in each of the plurality of terminals will be described.

Figure 5:
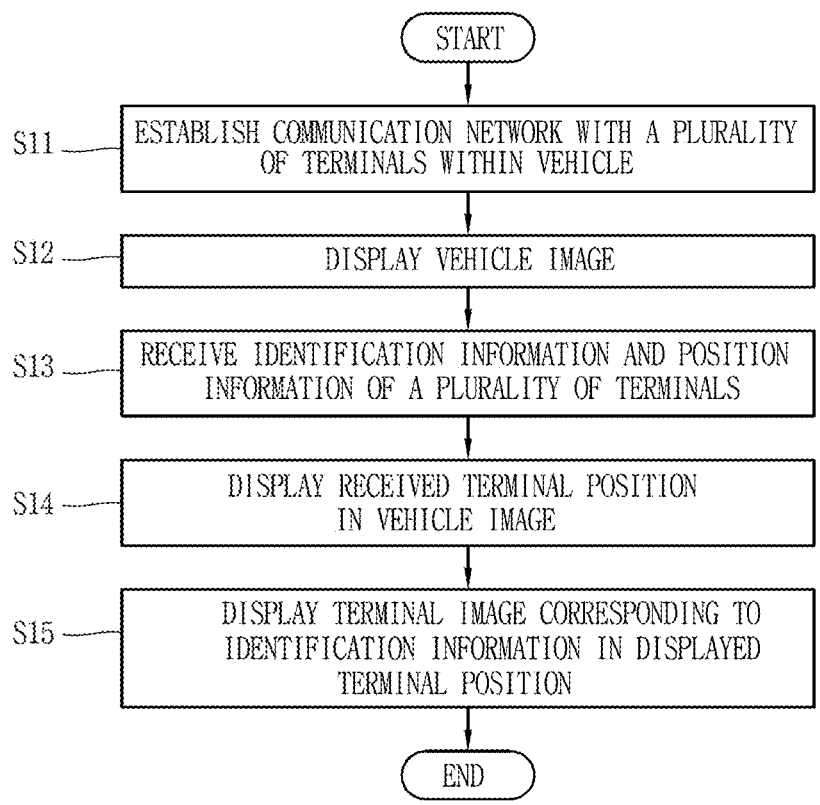
FIG. 5 is a flow chart illustrating an information providing method according to an exemplary embodiment of the present disclosure.

FIG. 5 is a flow chart illustrating an information providing method according to an exemplary embodiment of the present disclosure.

The communication unit 206 establishes a wireless communication network or a wired communication network with one or more mobile communication terminals within a vehicle according to a user request (step S11). For example, the communication unit 206 may establish a wireless communication network or a wired communication network with one or more mobile communication terminals within a vehicle according to a user request, or may establish a wireless communication network or a wired communication network with the one or more mobile communication terminals within a vehicle when a communication request is received from the one or more mobile communication terminals within the vehicle. The user request may be any one among voice recognition for connection of a wireless or wired communication network, a touch input for connection of a wireless or wired communication network, a gesture for connection of a wireless or wired communication network, and a button for connection of a wireless or wired communication network.

Figure 6A:
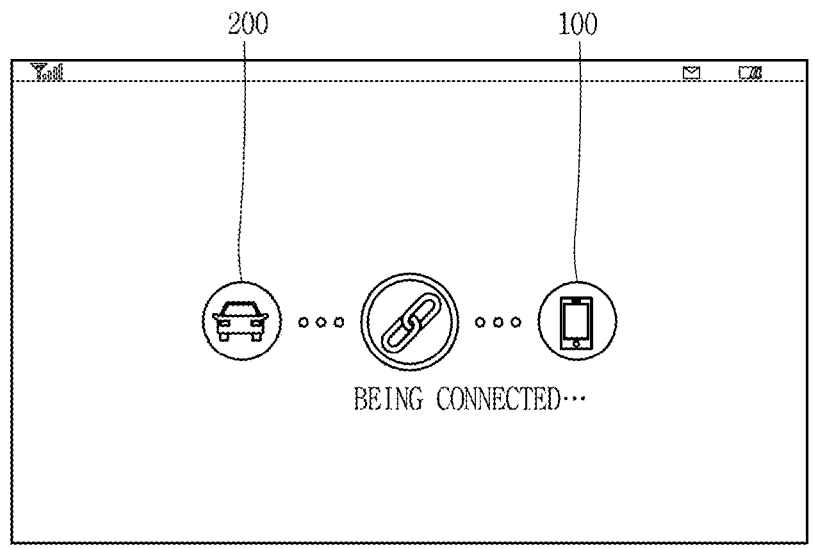
FIGS. 6A and 6B are views illustrating images indicating a state of connection of a communication network according to an exemplary embodiment of the present disclosure.
Figure 6B:
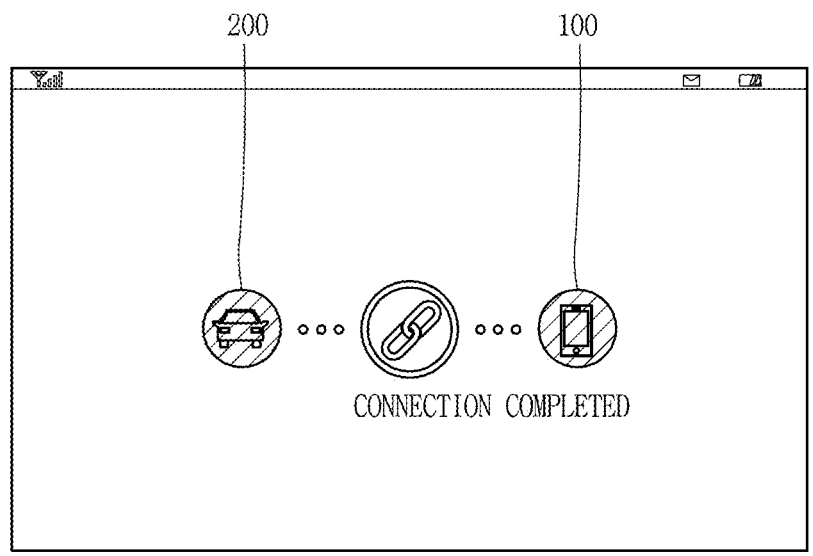

FIGS. 6A and 6B are views illustrating images indicating a state of connection of a communication network according to an exemplary embodiment of the present disclosure.

As illustrated in FIG. 6A, when the telematics terminal 200 installed in a vehicle and a mobile communication terminal within the vehicle are being connected via a communication network, the control unit 240 displays an image indicating the connection via a communication network on the display unit 201. In an exemplary embodiment of the present disclosure, the telematics terminal 200 is regarded as a vehicle.

As illustrated in FIG. 6B, when connection of the telematics terminal (which is regarded as a vehicle) 200 installed in the vehicle and the mobile communication terminal via a communication network is completed, the control unit 240 displays an image indicating completion of the connection via a communication network on the display unit 201. When the connection of the telematics terminal 200 installed in the vehicle and the mobile communication terminal within the vehicle via a communication network is completed, the control unit 240 may change a vehicle image and a mobile communication terminal image included in the image indicating the completion of the connection of a communication network to a preset color (for example, a blue color, a red color, and the like), or change the vehicle image and the mobile communication terminal image to a preset shape (for example, a circular shape, a quadrangular shape, a star-like shape, and the like).

When a wireless communication network or a wired communication network is established with the mobile communication terminal, the control unit 240 displays a previously stored vehicle image on the display unit 201 (step S12). When the previously stored vehicle image is selected by the user, the control unit 240 may display a background image (or an application page) including icons (for example, an Internet icon, a navigation icon, a video icon, a music icon, and the like) of application programs of the telematics terminal 200 on the display unit 201.

After displaying the vehicle image on the display unit 201, the control unit 240 receives identification information and position information from the mobile communication terminal 100 through the communication unit (step S13). The received identification information may include type information, model information, and serial information, and the like, of the mobile communication terminal 100, and the received position information is information indicating where the mobile communication terminal 100 is positioned among a position of a driver's seat, a position of a passenger seat, a position of the back seat of the driver's seat, a position of the back seat of the passenger seat.

The control unit 240 displays the received position information in the vehicle image (step S14), and displays a mobile communication terminal image corresponding to the identification information in the displayed position information (step S15).

FIGS. 7A through 7D are views illustrating images of a mobile communication terminal (or mobile communication terminals) displayed in a vehicle image according to an exemplary embodiment of the present disclosure.

Figure 7A:
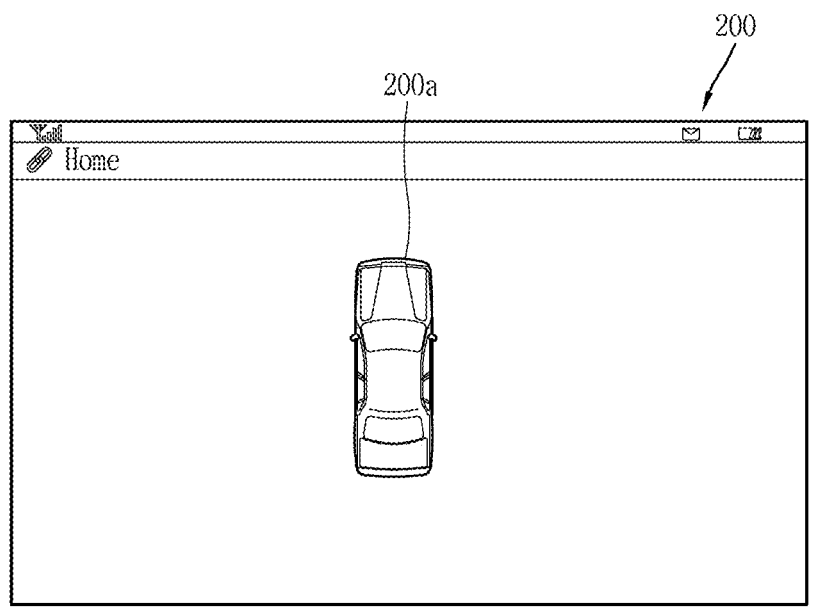
FIGS. 7A through 7D are views illustrating images of a mobile communication terminal (or mobile communication terminals) displayed in a vehicle image according to an exemplary embodiment of the present disclosure.

As illustrated in FIG. 7A, when a wireless communication network or a wired communication network is established with the mobile communication terminal, the control unit 240 displays a vehicle image 200a on the display unit 201.

Figure 7B:
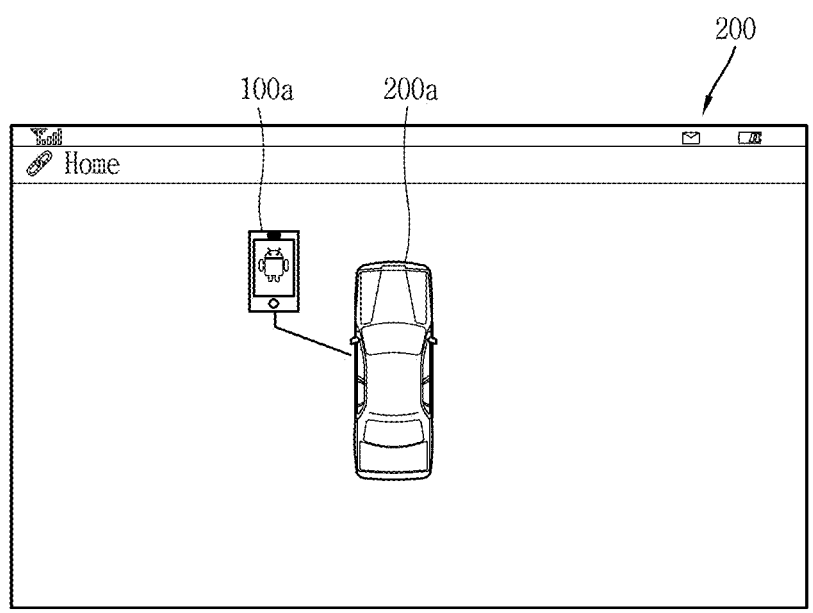

As illustrated in FIG. 7B, when first position information and first identification information are received from a first mobile communication terminal 100A among a plurality of mobile communication terminals within the vehicle, the control unit 240, the control unit 240 displays the first position information in the vehicle image 200a, and displays a first mobile communication terminal image 100a corresponding to the first identification information in the displayed first position information.

For example, when it is assumed that the first information is information indicating a position of a driver's seat of the vehicle, the control unit 240 may display the first mobile communication terminal image 100a in a position of the driver's seat of the vehicle image 200a, whereby the user may recognize by intuition that the first mobile communication terminal 100A positioned in the driver's seat of the vehicle is connected to the telematics terminal 200.

Figure 7C:
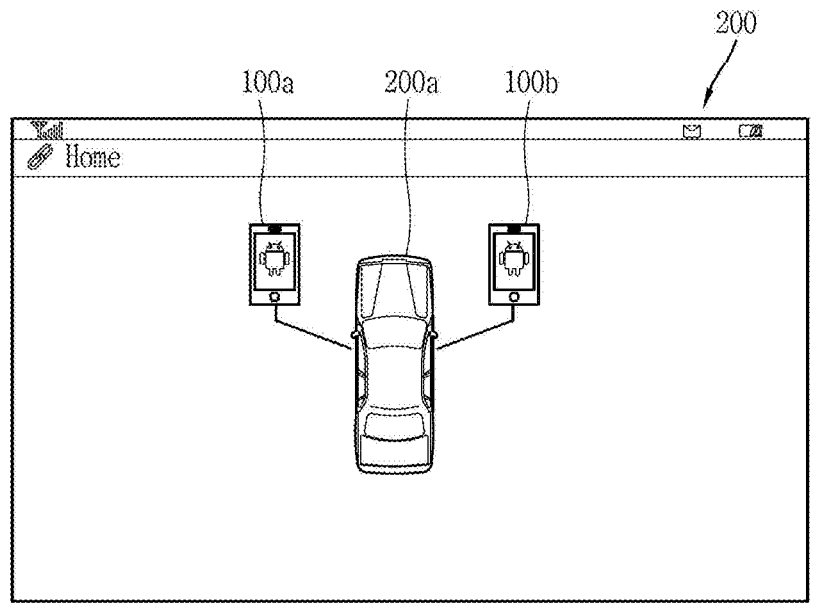

As illustrated in FIG. 7C, when second position information and second identification information are received from the second mobile communication terminal 100B among the plurality of mobile communication terminals within the vehicle, the control unit 240 displays the second position information in the vehicle image 200a and displays a second mobile communication terminal image 100b corresponding to the second identification information in the displayed second position information. For example, when it is assumed that the second position information is information indicating a position of the passenger seat of the vehicle, the control unit 240 may display the second mobile communication terminal image 100b in the position of the driver's seat of the vehicle image 200a, whereby the user may recognize by intuition that the second mobile communication terminal 100B positioned in the passenger seat of the vehicle has been connected to the telematics terminal 200.

Figure 7D:
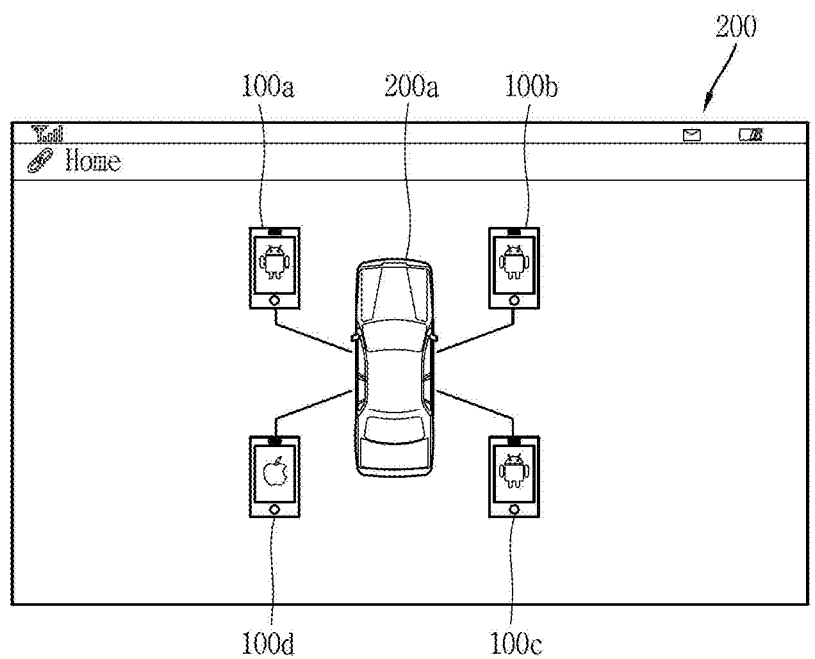

As illustrated in FIG. 7D, when third and fourth position information and third and fourth identification information are received from the third and fourth mobile communication terminals 100C and 100D among the plurality of mobile communication terminals within the vehicle, the control unit 240 displays the third and fourth position information in the vehicle image 200a and displays third and fourth mobile communication terminal images 100c and 100d corresponding to the third and fourth identification information in the displayed third and fourth position information. For example, when it is assumed that the third position information is information indicating a position of a back seat of the passenger seat of the vehicle, the control unit 240 may display the third mobile communication terminal image 100c in the position of the back seat of the passenger seat of the vehicle image 200a, whereby the user may recognize that the third mobile communication terminal 100C positioned in the back seat of the passenger seat of the vehicle has been connected to the telematics terminal 200 by intuition.

When it is assumed that the fourth position information is information indicating a position of a back seat of the driver's seat of the vehicle, the control unit 240 may display the fourth mobile communication terminal image 100d in the position of the back seat of the driver's seat of the vehicle image 200a, whereby the user may recognize by intuition that the fourth mobile communication terminal 100D positioned in the back seat of the driver's seat of the vehicle has been connected to the telematics terminal 200.

Hereinafter, a method of receiving position information of a plurality of mobile communication terminals within a vehicle will be described with reference to FIG. 8.

Figure 8:
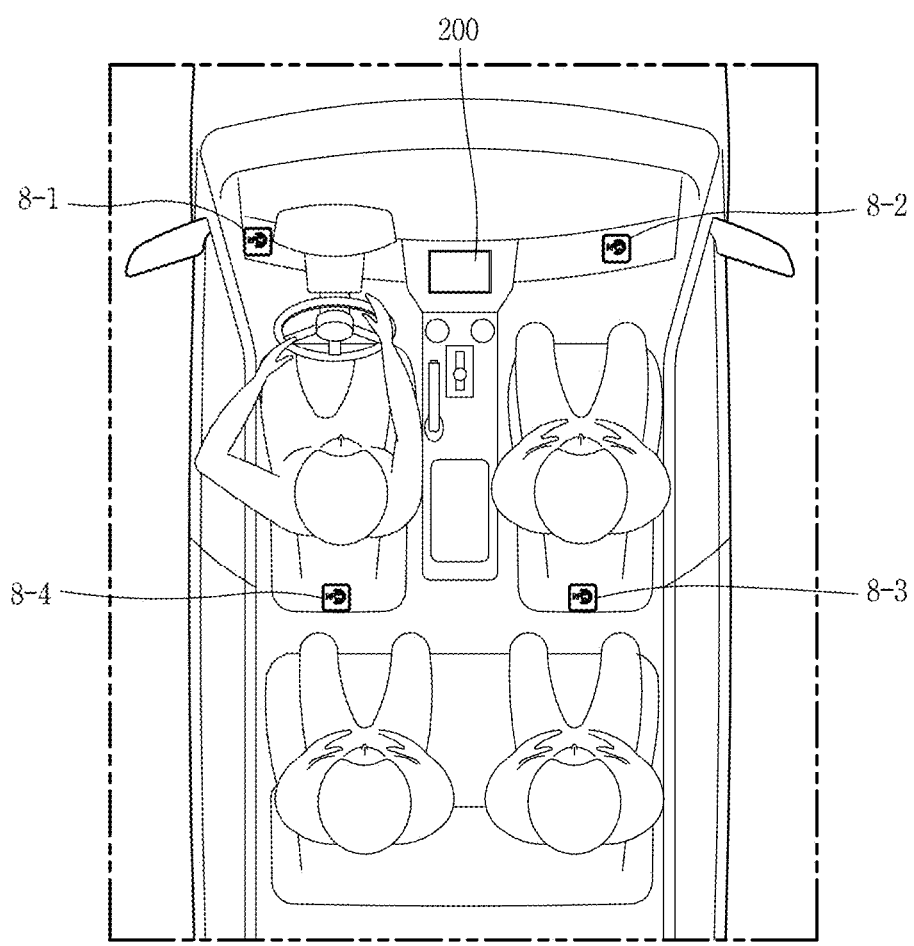
FIG. 8 is a view illustrating a position information generating unit generating position information of a mobile communication terminal within a vehicle according to exemplary embodiments of the present disclosure.

FIG. 8 is a view illustrating a position information generating unit generating position information of a mobile communication terminal within a vehicle according to exemplary embodiments of the present disclosure.

As illustrated in FIG. 8, the information providing apparatus according to exemplary embodiments of the present disclosure may further include a position information generating unit generating current position information of the plurality of mobile communication terminals within a vehicle. The position information generating unit includes a first near field communication (NFC) (or radio-frequency identification (RFID) tag 8-1 installed in the driver's seat of the vehicle and generating the first position information indicating a position of the driver's seat of the vehicle, a second NFC tag 8-2 installed in the passenger seat of the vehicle and generating the second position information indicating a position of the passenger seat of the vehicle, a third NFC tag 8-3 installed in the back seat of the passenger seat of the vehicle and generating the third position information indicating a position of the back seat of the passenger seat of the vehicle, and a fourth NFC tag 8-4 installed in the back seat of the driver's seat of the vehicle and generating the fourth position information indicating a position of the back seat of the driver's seat of the vehicle.

For example, when a particular mobile communication terminal approaches, the first NFC tag 8-1 transmits the first position information to the particular mobile communication terminal. The particular mobile communication terminal receives the first position information from the first NFC tag 8-1, and transmits identification information of the particular mobile communication terminal together with the received first position information to the control unit 240.

When a particular mobile communication terminal approaches, the second NFC tag 8-2 transmits the second position information to the particular mobile communication terminal. The particular mobile communication terminal receives the second position information from the second NFC tag 8-2 and transmits identification information of the particular mobile communication terminal together with the received second position information to the control unit 240.

When a particular mobile communication terminal approaches, the third NFC tag 8-3 transmits the third position information to the particular mobile communication terminal. The particular mobile communication terminal receives the third position information from the third NFC tag 8-3 and transmits identification information of the particular mobile communication terminal together with the received third position information to the control unit 240.

When a particular mobile communication terminal approaches, the fourth NFC tag 8-4 transmits the fourth position information to the particular mobile communication terminal. The particular mobile communication terminal receives the fourth position information from the fourth NFC tag 8-4 and transmits identification information of the particular mobile communication terminal together with the received fourth position information to the control unit 240.

The position information generating unit may include a first USB module installed in the driver's seat of the vehicle and providing the first position information indicating a position of the driver's seat of the vehicle to the control unit 240, a second USB module installed in the passenger seat of the vehicle and providing the second position information indicating a position of the passenger seat of the vehicle to the control unit 240, a third USB module installed in the back seat of the passenger seat of the vehicle and providing the third position information indicating a position of the back seat of the passenger seat of the vehicle to the control unit 240, and a fourth USB module installed in the back seat of the driver's seat of the vehicle and providing the fourth position information indicating a position of the back seat of the driver's seat of the vehicle to the control unit 240.

Hereinafter, another method of receiving position information of a plurality of mobile communication terminals within a vehicle will be described with reference to FIG. 9.

Figure 9:
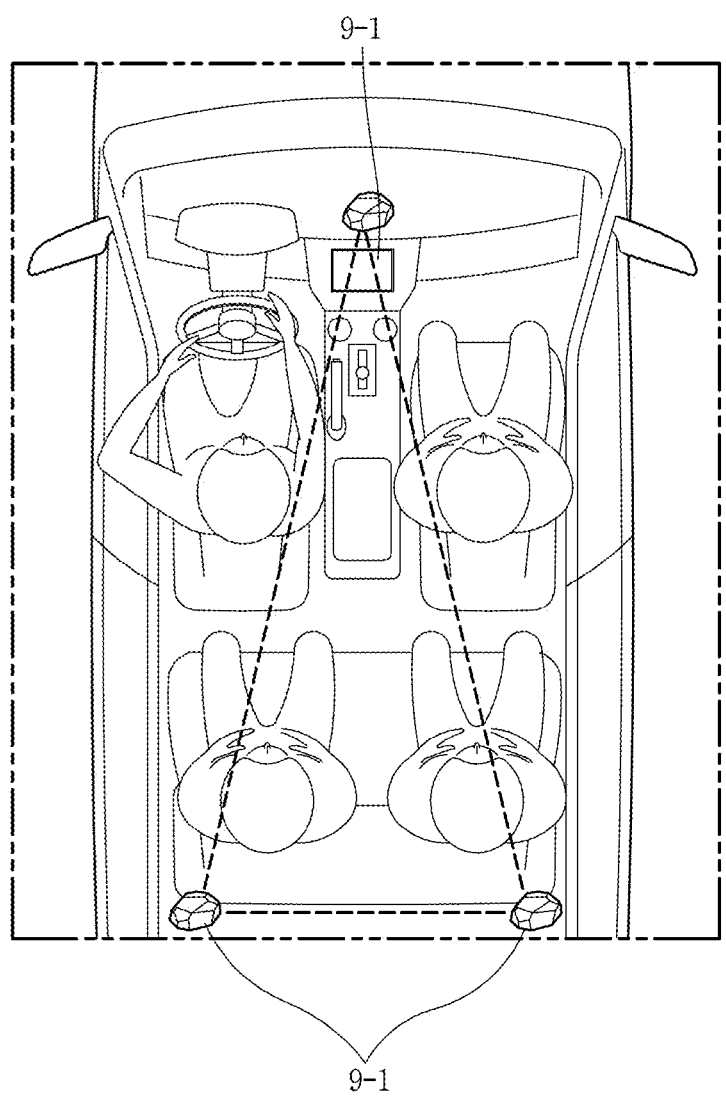
FIG. 9 is a view illustrating a method of receiving position information of a mobile communication terminal within a vehicle using a beacon according to an exemplary embodiment of the present disclosure.

FIG. 9 is a view illustrating a method of receiving position information of a mobile communication terminal within a vehicle using a beacon (for example, Bluetooth™ low energy beacon) according to an exemplary embodiment of the present disclosure.

As illustrated in FIG. 9, the control unit 240 may detect position information of a mobile communication terminal within a vehicle on the basis of signals from a plurality of beacons 9-1 installed within the vehicle. For example, the control unit 240 may detect a position of a mobile communication terminal within the vehicle through a triangulation technique using the beacons 9-1.

Hereinafter, another method of receiving position information of a plurality of mobile communication terminals within a vehicle will be described with reference to FIG. 10.

Figure 10:
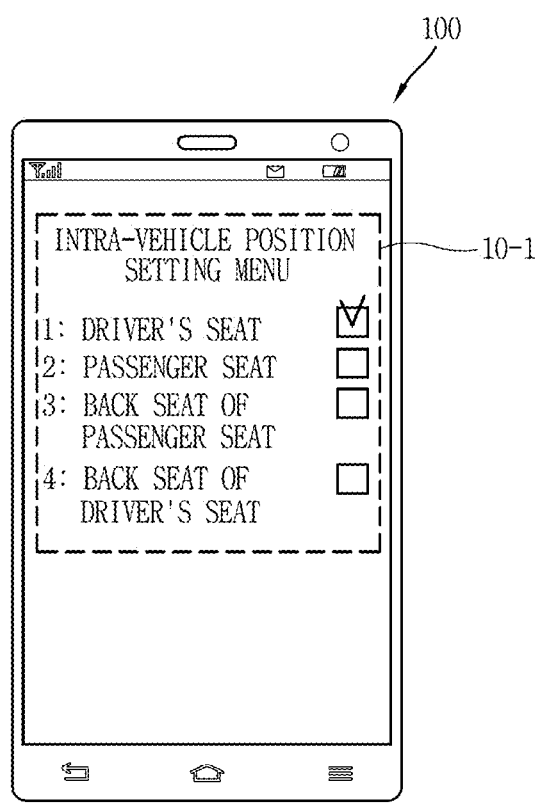
FIG. 10 is a view illustrating a method of receiving position information of a mobile communication terminal within a vehicle using a menu according to an exemplary embodiment of the present disclosure.

FIG. 10 is a view illustrating a method of receiving position information of a mobile communication terminal within a vehicle using a menu according to an exemplary embodiment of the present disclosure.

As illustrated in FIG. 10, the mobile communication terminal 100 displays an intra-vehicle position setting menu 10-1 on the display unit 151 according to a user request. The intra-vehicle position setting menu 10-1 may include a first item indicating a position of a driver's seat, a second item indicating a position of a passenger seat, a third item indicating a position of the back seat of the passenger seat, and a fourth item indicating a position of the back seat of the driver's seat.

When the first item is selected by the user, the mobile communication terminal 100 may generate first position information indicating the position of the driver's seat, and transmits the generated first position information to the control unit 240. When the second item is selected by the user, the mobile communication terminal 100 may generate second position information indicating the position of the passenger seat, and transmits the generated second position information to the control unit 240. When the third item is selected by the user, the mobile communication terminal 100 may generate third position information indicating the position of the back seat of the passenger seat, and transmits the generated third position information to the control unit 240. When the fourth item is selected by the user, the mobile communication terminal 100 may generate fourth position information indicating the position of the back seat of the driver's seat, and transmits the generated fourth position information to the control unit 240. Thus, in the information providing apparatus and the method thereof according to exemplary embodiments of the present disclosure, information (position information and identification information) of a state of connections between a plurality of mobile communication terminals within a vehicle may be checked quickly by intuition.

Figure 11:
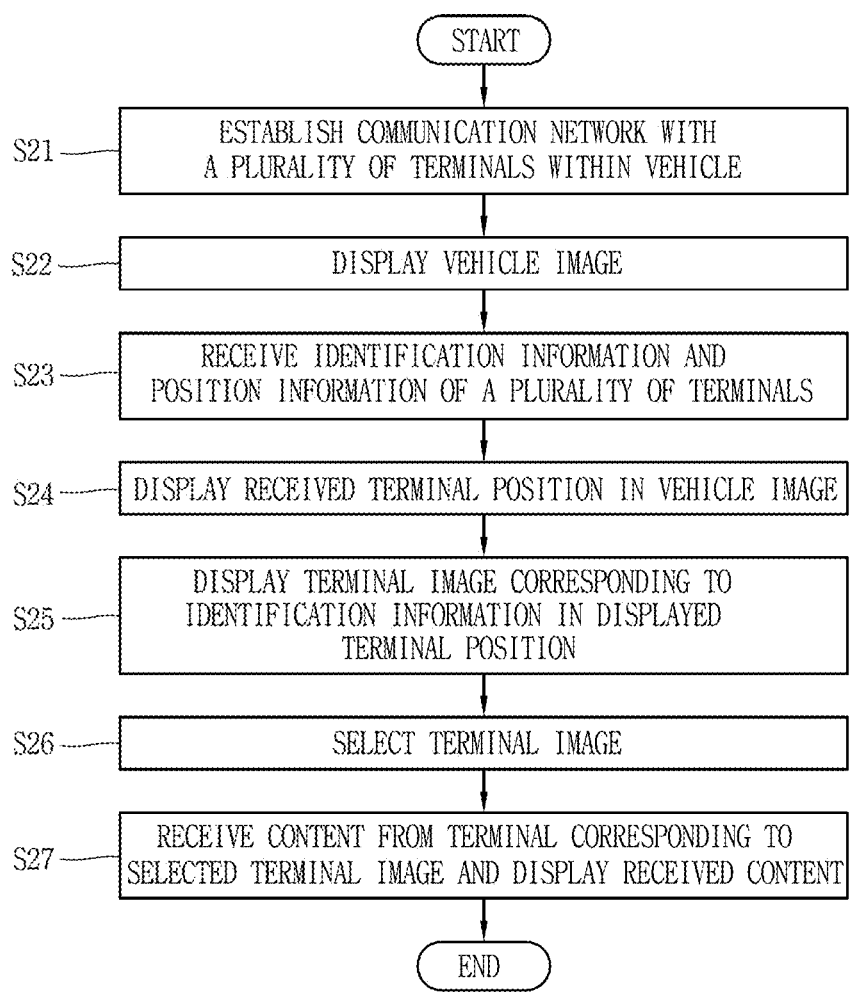
FIG. 11 is a flow chart illustrating an information providing method according to another exemplary embodiment of the present disclosure.

FIG. 11 is a flow chart illustrating an information providing method according to another exemplary embodiment of the present disclosure.

The communication unit 206 establishes a wireless communication network or a wired communication network with one or more mobile communication terminals within a vehicle according to a user request (step S21). For example, the communication unit 206 may establish a wireless communication network or a wired communication network with one or more mobile communication terminals within a vehicle according to a user request, or may establish a wireless communication network or a wired communication network with the one or more mobile communication terminals within a vehicle when a communication request is received from the one or more mobile communication terminals within the vehicle. The user request may be any one among voice recognition for connection of a wireless or wired communication network, a touch input for connection of a wireless or wired communication network, a gesture for connection of a wireless or wired communication network, and a button for connection of a wireless or wired communication network.

When a wireless communication network or a wired communication network is established with the mobile communication terminal, the control unit 240 displays a previously stored vehicle image on the display unit 201 (step S22). When the previously stored vehicle image is selected by the user, the control unit 240 may display a background image (or an application page) including icons (for example, an Internet icon, a navigation icon, a video icon, a music icon, and the like) of application programs of the telematics terminal 200 on the display unit 201.

After displaying the vehicle image on the display unit 201, the control unit 240 receives identification information and position information from the mobile communication terminal 100 through the communication unit (step S23). The received identification information may include type information, model information, and serial information, and the like, of the mobile communication terminal 100, and the received position information is information indicating where the mobile communication terminal 100 is positioned among a position of a driver's seat, a position of a passenger seat, a position of the back seat of the driver's seat, a position of the back seat of the passenger seat.

The control unit 240 displays the received position information in the vehicle image (step S24), and displays a mobile communication terminal image corresponding to the identification information in the displayed position information (step S25).

The control unit 240 selects the mobile communication terminal image according to a user request (step S26). For example, when a voice for selecting the displayed mobile communication terminal image is recognized, when a touch input for selecting the displayed mobile communication terminal image is received, when a gesture for selecting the displayed mobile communication terminal image is input, or when a button for selecting the displayed mobile communication terminal image is clicked, the control unit 240 selects the displayed mobile communication terminal image.

When the displayed mobile communication terminal image is selected, the control unit 240 receives content (for example, application program icons, a message, a schedule, a contact number, and the like) from a mobile communication terminal corresponding to the selected mobile communication terminal image, and displays the received content on the display unit 201 (step S27).

Thus, since the information providing apparatus and the method thereof according to another exemplary embodiment of the present disclosure interwork with the plurality of terminals within a vehicle and easily and quickly receive content desired by a user from the plurality of terminals and displays the received content, whereby information (for example, an application program, content, data, and the like) store din each of the plurality of terminals can be easily and quickly used.

Figure 12:
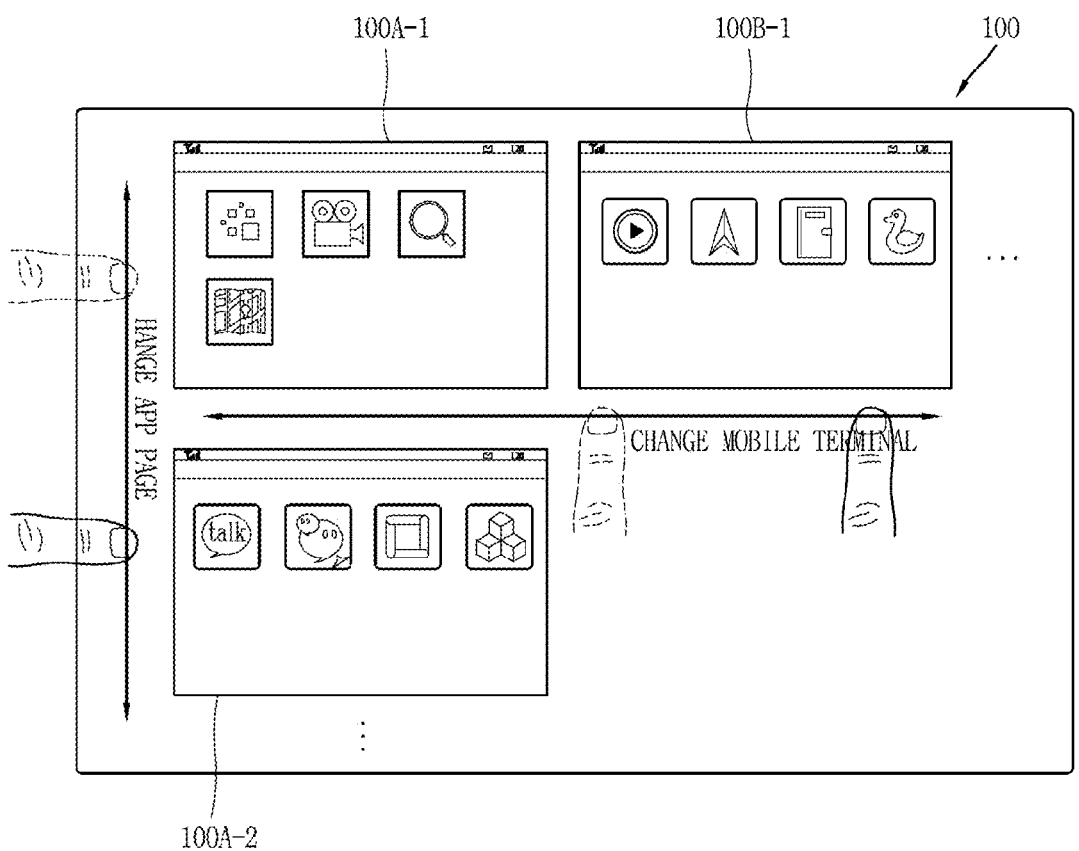
FIG. 12 is a view illustrating content received from a mobile communication terminal according to another exemplary embodiment of the present disclosure.

FIG. 12 is a view illustrating content received from a mobile communication terminal according to another exemplary embodiment of the present disclosure.

As illustrated in FIG. 12, when the displayed mobile communication terminal image (for example, 100*a*) is selected, the control unit 240 receives an APP (application) page (for example, 100A-1) including application program icons from the mobile communication terminal (for example, 100A) corresponding to the selected mobile communication terminal image (for example, 100*a*), and displays the received APP page on the display unit 201. When the displayed vehicle image 200*a* is selected, the control unit 240 displays application program icons stored in the telematics terminal 200 on the display unit 201.

In a state in which the received APP page is displayed on the display unit 201, when a first user input (for example, a drag input applied in a transverse direction) is received, the control unit 240 sequentially displays an App page 100A-1 of the first mobile communication terminal 100A, an App page 100B-1 of the second mobile communication terminal 100B, an App page 100C-1 of the third mobile communication terminal 100C, and an App page 100D-1 of the fourth mobile communication terminal 100D on the display unit 201.

In a state in which the received APP pages are displayed on the display unit 201, when a second user input (for example, a drag input applied in a longitudinal direction) is received, the control unit 240 sequentially displays a first App page 100A-1 of the first mobile communication terminal 100A, a second App page 100A-2 of the first mobile communication terminal 100A, and an nth App page 100A-n of the first mobile communication terminal 100A on the display unit 201.

Figure 13:
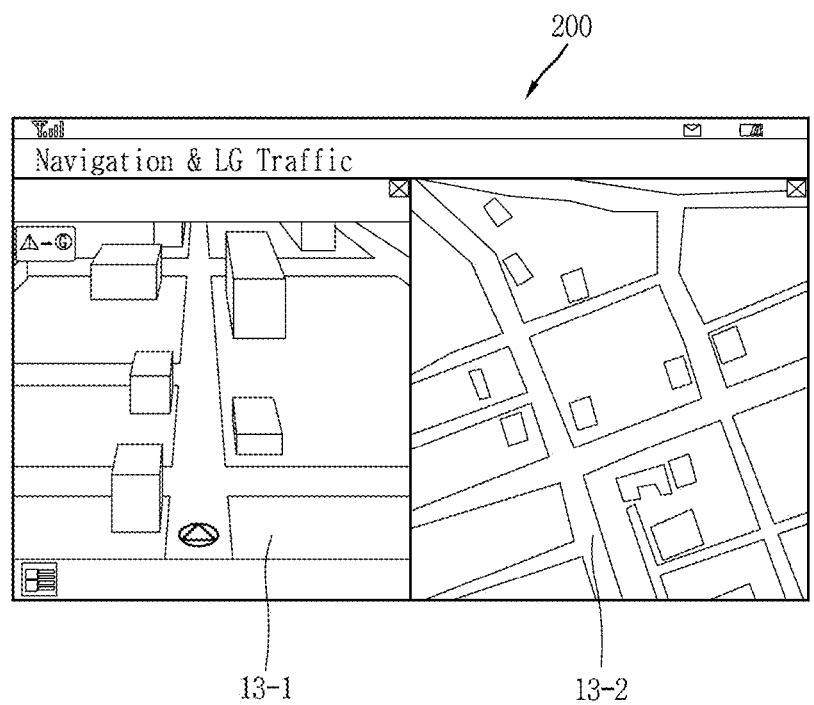
FIG. 13 is a view illustrating a method of receiving and executing an application program of a mobile communication terminal according to exemplary embodiments of the present disclosure.

FIG. 13 is a view illustrating a method of receiving and executing an application program of a mobile communication terminal according to exemplary embodiments of the present disclosure.

As illustrated in FIG. 13, when one or more application program icons are selected from the first App application page 100A-1 of the first mobile communication terminal 100A, the control unit 240 receives application programs corresponding to the one or more selected application icons from the first mobile communication terminal 100A and displays (executes) the received application programs on the display unit 201. For example, when first and second application program icons are selected from the first App page 100A-1 of the first mobile communication terminal 100A, the control unit 240 receives first and second application programs 13-1 and 13-2 corresponding to the first and second application program icons from the first mobile communication terminal 100A and displays (executes) the received first and second application programs 13-1 and 130-2 in a single screen of the display unit 201. The first and second application programs 13-1 and 13-2 may be different types of navigation application programs. The first application program 130-1 may be a navigation program, and the second application program 13-2 may be an application program related to video, music, and the like.

When one or more application program icons are selected from the first App page 100A-1 of the first mobile communication terminal 100A and the App page 100B-1 of the second mobile communication terminal 100B, respectively, the control unit 240 receives application programs corresponding to the selected application program icons from the first and second mobile communication terminals 100A and 100B, respectively, and displays (executes) the received application programs in a single screen of the display unit 201. For example, when a first application program icon of the first App page 100A-1 of the first mobile communication terminal 100A and a second application program icon of the App page 100B-1 of the second mobile communication terminal 100B are sequentially selected, the control unit 240 receives first and second application programs corresponding to the selected first and second application program icons from the first and second mobile communication terminals 100A and 100B, respectively, and displays (executes) the received first and second application programs in a single screen of the display unit 201.

The control unit 240 may maintain display regions of the first and second application programs 13-1 and 13-2 or may magnify or reduce the display regions of the first and/or second application programs 13-1 and 13-2 through a pinch-to-zoom function of the user.

In a state in which the first and second application programs 13-1 and 13-2 are displayed, when a voice for stopping (or terminating) the execution (or displaying) of the first and/or second application programs 13-1 and 13-2 is recognized, the control unit 240 may stop (or terminate) execution (displaying) of the first and/or second application programs 13-1 and 13-2.

Figure 14:
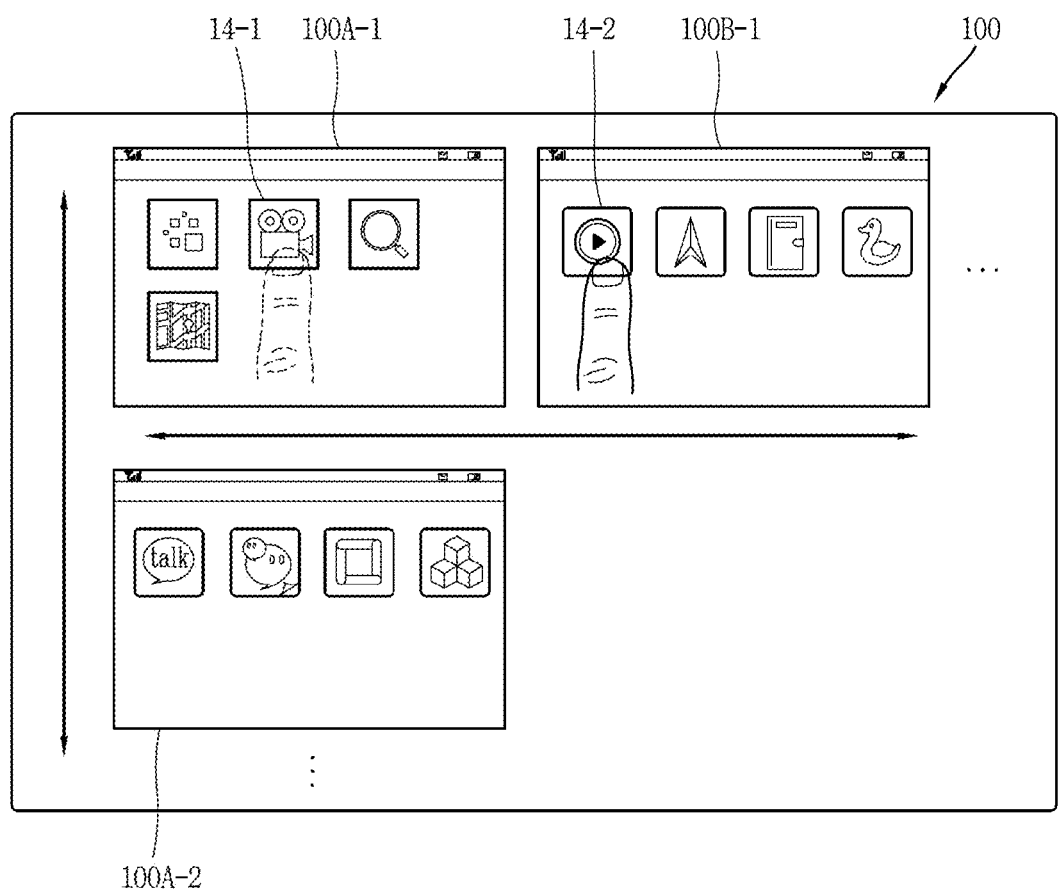
FIG. 14 is a view illustrating another method of receiving and executing an application program of a mobile communication terminal according to exemplary embodiments of the present disclosure.

FIG. 14 is a view illustrating another method of receiving and executing an application program of a mobile communication terminal according to exemplary embodiments of the present disclosure.

As illustrated in FIG. 14, after a first application program icon 14-1 of a first App page 100A-1 in the first mobile communication terminal 100A is long-touched, when a second application program icon 14-2 of a second App page 100B-1 in the second mobile communication terminal 100B is short-touched, the control unit 240 simultaneously receives first and second application programs corresponding to the touched first and second application program icons from the first and second mobile communication terminals 100A and 100B, respectively, and displays (executes) the received first and second application programs in a single screen of the display unit 201.

When the first application program 14-1 is long-touched, the control unit 240 displays a preset animation indicating that the first application program icon 14-1 has been long-touched, on the first application program icon 14-1, and when the second application program icon 14-2 is subsequently short-touched, the control unit 240 receives first and second application programs from the first and second mobile communication terminals 100A and 100B, and executes the received first and second application programs.

Figure 15:
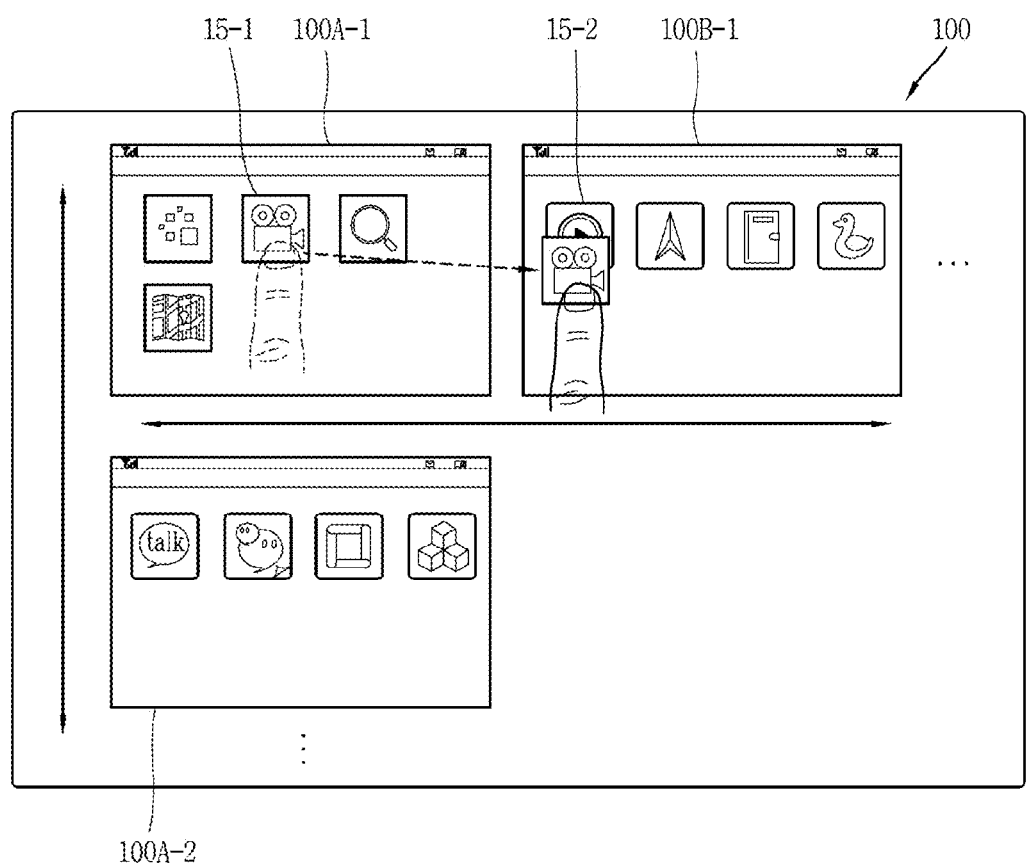
FIG. 15 is a view illustrating still another method of receiving and executing an application program of a mobile communication terminal according to exemplary embodiments of the present disclosure.

FIG. 15 is a view illustrating still another method of receiving and executing an application program of a mobile communication terminal according to exemplary embodiments of the present disclosure.

As illustrated in FIG. 15, when a first application program icon 15-1 of a first App page 100A-1 in the first mobile communication terminal 100A is drag-and-dropped to a second application program icon 15-2 of a second App page 100B-1 of the second mobile communication terminal 100B, the control unit 240 simultaneously receives first and second application programs corresponding to the first and second application program icons from the first and second mobile communication terminals 100A and 100B, respectively, and displays (executes) the received first and second application programs in a single screen of the display unit 201.

When voices corresponding to the first application program icon 15-1 and the second application program icon 15-2 are recognized, the control unit 240 may simultaneously receive the first and second application programs corresponding to the first and second application program icons from the first and second mobile communication terminals 100A and 100B, respectively, and display (execute) the received first and second application programs in a single screen of the display unit 201.

Figure 16A:
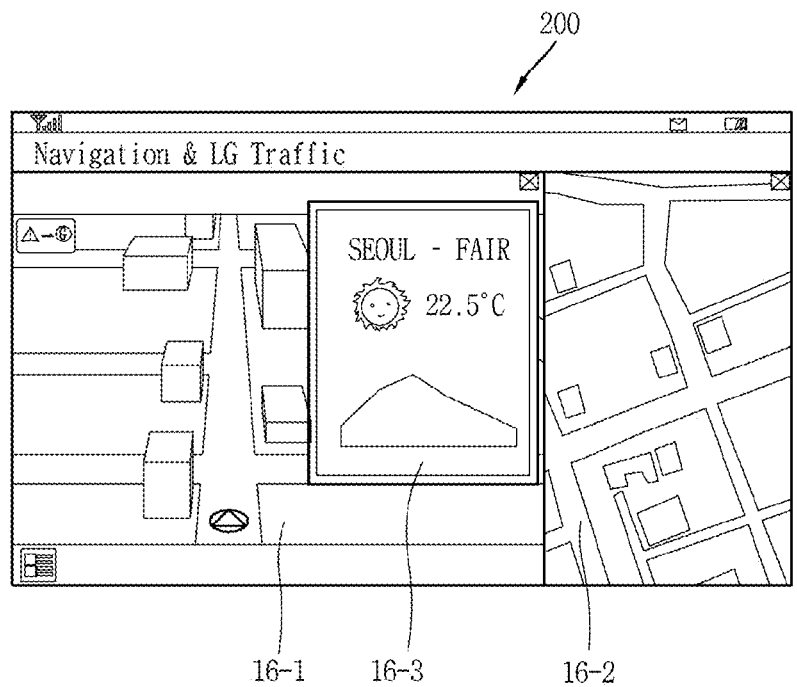
FIGS. 16A and 16B are views illustrating yet another method of receiving and executing an application program of a mobile communication terminal according to exemplary embodiments of the present disclosure.
Figure 16B:
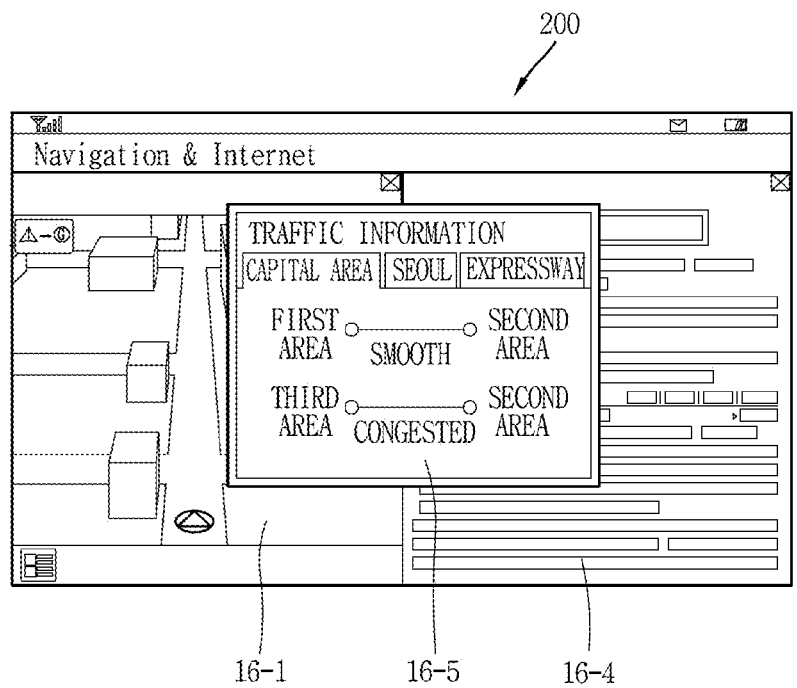

FIGS. 16A and 16B are views illustrating yet another method of receiving and executing an application program of a mobile communication terminal according to exemplary embodiments of the present disclosure.

As illustrated in FIG. 16A, the control unit 240 receives application programs selected by the user from one or a plurality of mobile communication terminals, displays applications programs 16-1 and 16-2 excluding an application program 16-3 providing information (for example, one-time information) changed in real time among the received application programs on the display unit 201 according to a display format of the application programs 16-1 and 16-2, and displays the application program 16-3 providing the information (for example, one-time information) changed in real time on the display unit 201 according to a display format different from that of the application program 16-3. For example, the control unit 240 receives a first navigation, a second navigation, and a weather-related application program 16-1, 16-2, and 16-3 selected by the user from the one or the plurality of mobile communication terminals, displays the first and second navigation application programs 16-1 and 16-2, excluding the weather-related application program (an application program providing one-time information such as information changed in real time) 16-3, among the received application programs 16-1, 16-2, and 16-3, according to a display format of the first and second navigation application programs 16-1 and 16-2, and displays the weather-related application program 16-3 providing weather information on the display unit 201 through a pop-up window.

As illustrated in FIG. 16B, the control unit 240 receives navigation, Internet, and traffic information-related application programs 16-1, 16-4, and 16-5 selected by the user from the one or the plurality of mobile communication terminals, displays the navigation and Internet application programs 16-1 and 16-4, excluding the traffic information-related application program (an application program providing one-time information such as information changed in real time) among the received application programs 16-1, 16-4, and 16-5, according to a display format of the navigation and Internet application programs 16-1 and 16-4, and displays the traffic information-related application program 16-5 providing the traffic information on the display unit 201 through a pop-up window.

As described above, according to the information providing apparatus and method of exemplary embodiments of the present disclosure, a user may easily and quickly check information (position information and identification information) of a state of connections between a plurality of mobile terminals within a vehicle by intuition.

Also, since the information providing apparatus of exemplary embodiments of the present disclosure interworks with a plurality of terminals within a vehicle and easily and quickly receive content desired by the user from the plurality of terminals and display the received content, information (for example, an application program, content, data, and the like) stored in each of the plurality of terminals may be easily and rapidly used.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An information providing apparatus comprising:
    a communication unit configured to establish a communication network with a mobile terminal within a vehicle;
    a display unit configured to display a vehicle image; and
    a control unit configured to receive identification information of the mobile terminal and position information of the mobile terminal through the communication unit, and to control the display unit to display the received position information of the mobile terminal in the vehicle image and display a mobile terminal image corresponding to the identification information in the displayed position information of the mobile terminal.

2. The information providing apparatus of claim 1, further comprising:
    a position information generating unit configured to generate the position information corresponding to a seat position of the vehicle when the mobile terminal is in proximity thereto, and to transmit the generated position information to the mobile terminal,
    wherein the mobile terminal transmits the position information transmitted from the position information generating unit to the control unit.

3. The information providing apparatus of claim 2, wherein the position information generating unit comprises:
    a first near field communication (NFC) tag installed in the driver's seat of the vehicle and configured to generate first position information indicating a position of the driver's seat of the vehicle;
    a second NFC tag installed in the passenger seat of the vehicle and configured to generate second position information indicating a position of the passenger seat of the vehicle;
    a third NFC tag installed in the back seat of the passenger seat of the vehicle and configured to generate third position information indicating a position of the back seat of the passenger seat of the vehicle; and
    a fourth NFC tag installed in the back seat of the driver's seat of the vehicle and configured to generate fourth position information indicating a position of the back seat of the driver's seat of the vehicle.

4. The information providing apparatus of claim 2, wherein the position information generating unit comprises:
    a first USB module installed in the driver's seat of the vehicle and configured to provide the first position information indicating a position of the driver's seat of the vehicle to the control unit;
    a second USB module installed in the passenger seat of the vehicle and configured to provide the second position information indicating a position of the passenger seat of the vehicle to the control unit;
    a third USB module installed in the back seat of the passenger seat of the vehicle and configured to provide the third position information indicating a position of the back seat of the passenger seat of the vehicle to the control unit; and
    a fourth USB module installed in the back seat of the driver's seat of the vehicle and configured to provide the fourth position information indicating a position of the back seat of the driver's seat of the vehicle to the control unit.

5. The information providing apparatus of claim 1, wherein the control unit detects position information of a mobile terminal within the vehicle on the basis of signals from a plurality of beacons installed within the vehicle.

6. The information providing apparatus of claim 1, wherein the position information is position information selected from a position setting menu of the mobile terminal.

7. The information providing apparatus of claim 6, wherein the position setting menu includes:
    a first item indicating the position of the driver's seat;
    a second item indicating the position of the passenger seat;
    a third item indicating the position of the back seat of the passenger seat; and a fourth item indicating the position of the back seat of the driver's seat.

8. The information providing apparatus of claim 1, wherein when the mobile terminal image is selected, the control unit receives content from a mobile terminal corresponding to the selected mobile terminal image, and displays the received content on the display unit.

9. The information providing apparatus of claim 8, wherein the content is one or more among application program icons, a message, a schedule, and a contact number.

10. The information providing apparatus of claim 1, wherein, on the basis of position information of each of a plurality of mobile terminals within the vehicle, the control unit displays a plurality of mobile terminal images corresponding to the plurality of mobile terminals in seat positions of the vehicle image, and when a first mobile terminal image is selected from among the plurality of mobile terminal images, the control unit receives a first page including application program icons from a first mobile terminal corresponding to the selected first mobile terminal image, and displays the received first page on the display unit, and in a state in which the first page is displayed on the display unit, when a first user input is received, the control unit receives a second page including application program icons from a second mobile terminal among the plurality of mobile terminals, and displays the received second page on the display unit, and in a state in which the first page is displayed on the display unit, when a second user input is received, the control unit receives a next page following the first page from the first mobile terminal and displays the received next page on the display unit.

11. The information providing apparatus of claim 10, wherein when one or more application program icons are selected from the first page, the control unit receives application programs corresponding to the one or more selected application program icons from the first mobile terminal and displays the received application programs on the display unit.

12. The information providing apparatus of claim 10, wherein when one or more application program icons are selected from a first page of the first mobile terminal and a second page of the second mobile terminal, the control unit receives application programs corresponding to the one or more selected application program icons from the first and second mobile terminals, and displays the received application programs on a single screen of the display unit.

13. The information providing apparatus of claim 10, wherein after a first application program icon of the first page of the first mobile terminal is long-touched, when a second application program icon of the second page of the second mobile terminal is short-touched, the control unit simultaneously receives first and second application programs corresponding to the first and second application program icons from the first and second mobile communication terminals, and displays the received first and second application programs on a single screen of the display unit.

14. The information providing apparatus of claim 10, wherein when the first application program icon of the first page of the first mobile terminal is drag-and-dropped to the second application program icon of the second page of the second mobile terminal, the control unit simultaneously receives first and second application programs corresponding to the first and second application program icons from the first and second mobile communication terminals, and displays the received first and second application programs on a single screen of the display unit.

15. The information providing apparatus of claim 10, wherein the control unit displays an application program excluding an application program providing one-time information, among the received first and second application programs, on the display unit according to a first display format, and displays the application program providing the one-time information on the display unit according to a second display format different from the first display format.

16. An information providing method comprising:
    establishing a communication network with a mobile terminal within a vehicle;
    displaying a vehicle image on a display unit;
    receiving identification information of the mobile terminal and position information of the mobile terminal through the communication network; and
    controlling the display unit to display the received position information of the mobile terminal in the vehicle image and to display a mobile terminal image corresponding to the identification information in the displayed position information of the mobile terminal.

17. The information providing method of claim 16, wherein the receiving of identification information of the mobile terminal and position information of the mobile terminal comprises:
    transmitting the position information corresponding to a seat position of the vehicle to the mobile terminal; and
    receiving the identification information of the mobile terminal, together with the position information which has been transmitted to the mobile terminal, from the mobile terminal.

18. The information providing method of claim 17, wherein the position information includes one or more of first position information indicating a position of the driver's seat of the vehicle, second position information indicating a position of the passenger seat of the vehicle, third position information indicating a position of the back seat of the passenger seat of the vehicle, and fourth position information indicating a position of the back seat of the driver's seat of the vehicle.

19. The information providing method of claim 16, further comprising:
    displaying a plurality of mobile terminal images corresponding to a plurality of mobile terminals in seat positions of the vehicle image on the basis of position information of each of the plurality of mobile terminals within the vehicle;
    when a first mobile terminal image is selected from among the plurality of mobile terminal images, receiving a first page including application program icons from a first mobile terminal corresponding to the selected first mobile terminal image, and displaying the received first page on the display unit;
    when a first user input is received in a state in which the first page is displayed on the display unit, receiving a second page including application program icons from a second mobile terminal among the plurality of mobile terminals and displaying the received second page on the display unit; and
    when a second user input is received in a state in which the first page is displayed on the display unit, receiving a next page following the first page from the first mobile terminal and displaying the received next page on the display unit.

20. The information providing method of claim 19, further comprising:

selecting a first application program icon from within the first page;
selecting a second application program icon from within the second page;
receiving first and second application programs corresponding to the first and second application program icons from the first and second mobile terminals, respectively;
displaying an application program excluding an application program providing one-time information, among the received first and second application programs, on the display unit according to a first display format; and
displaying the application program providing the one-time information on the display unit according to a second display format different from the first display format.

* * * * *